April 6, 1965  G. SOMMER  3,176,780
GARDEN HOES

Filed Feb. 10, 1964  2 Sheets-Sheet 1

INVENTOR.
George Sommer

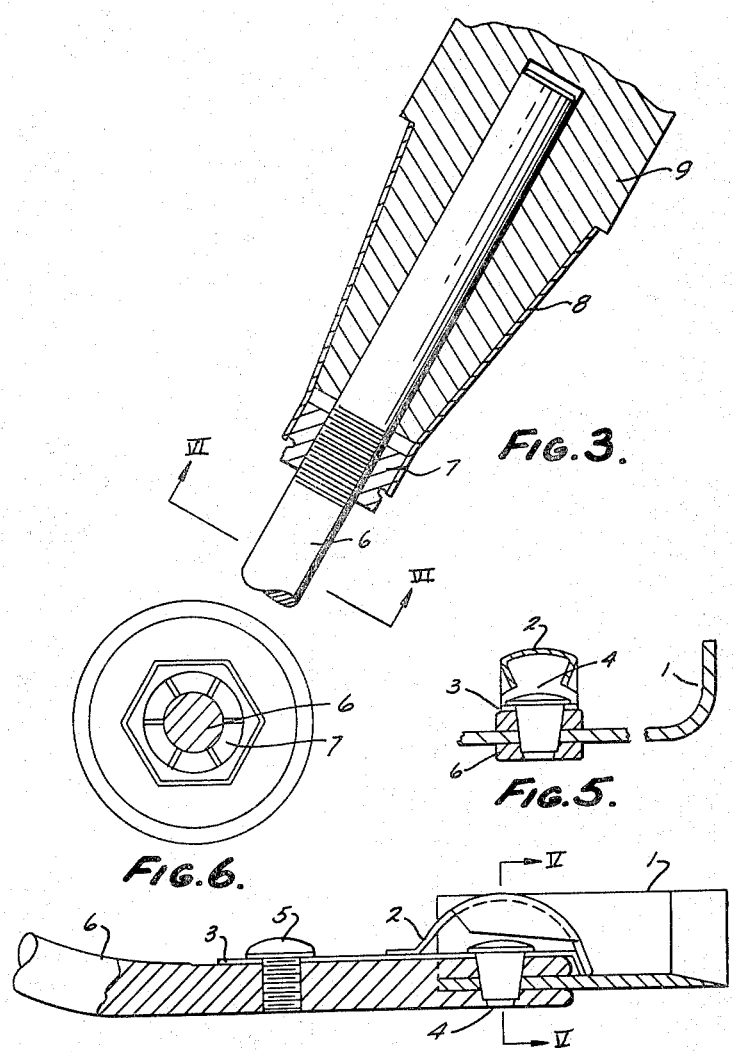

3,176,780
GARDEN HOES
George Sommer, 33 Aztec Drive SW.,
Grand Rapids, Mich.
Filed Feb. 10, 1964, Ser. No. 344,166
1 Claim. (Cl. 172—377)

This hoe has several new features that will make gardening much easier. It has a thin narrow blade with ½ in. curved up ends which will allow very close hoeing to the plants just after they come through the soil, without covering them and will cut off all the weeds just below the surface. The blades are so constructed and mounted that as the soil drops over them it leaves a fine weed-free mulch, helping to conserve moisture, which is very important in raising a good garden. The formed end blade is also a guard to keep the operator, especially the inexperienced, from cutting off any plants. This hoe adapted to use blades of varying lengths, made of stainless steel, which will not rust or corrode, thereby always assuring the operator of a clean blade which is very important in the ease and efficiency of operation. The blades of varying lengths assure the operator of a sharp hoe of the right size for all aypes of gardening. These blades are attached with a spring locking pin type fastener allowing for an easy and rapid change of blades without tools. This hoe may be equipped with handles of varying lengths which will allow a person not only to perform general hoeing operations from a standing position but also may be used to good advantage by those persons who wish to work around flowers, etc. from a kneeling position. The handles are very easily and quickly interchanged without tools of any kind by screwing or unscrewing from a lock type nut which is welded to the ferrule of the handles.

Be it known that I, George Sommer, have invented a new and useful improvement in garden hoes; and I do hereby declare that the following is a full, clear, and exact description thereof, reference being had to the accompanying drawings, making a part of this specification, and to the reference numbers marked thereon.

In the drawings:

FIG. 3 is a sectional view taken on plane III—III of FIG. 1;

FIG. 4 is a sectional view taken on plane IV—IV of FIG. 1;

FIG. 5 is a sectional view taken on plane V—V of FIG. 4; and

FIG. 6 is a sectional view taken on plane VI—VI of FIG. 3.

Figure 1:
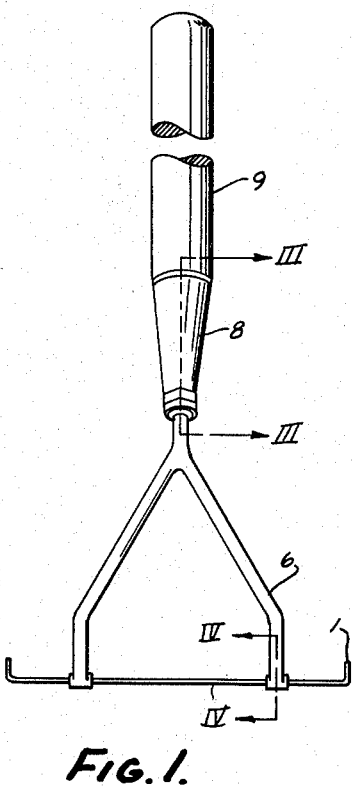
FIG. 1 is a front elevational view of the novel hoe.

The title of this hoe is called the "Change-A-Blade Wonder Hoe" for exact reasons given in the following descriptions.

My invention consists in constructing a hoe with a bifurcated shank which is attached to a removeable blade at two points, the other end of the shank terminating in a socket of a removeable handle.

The construction of said hoe is as follows: The blade 2 is made of thin stanless steel about one sixteenth of an inch thick and about one and one half inches wide and lengths from five to ten inches. The blade has formed up ends 1 and a beveled edge for cutting as shown in FIGS. 4 and 5. This hoe may be equipped with changeable blades of various lengths. Each blade would be centrally located on the bicurcated shank.

Each blade receiving end of the bifurcated shank contains a spring locking pin type of fastener. Each fastener consists of a flat spring 3; tapered pin 4; screw, 5 ("Sems" type or equivalent); and a finger grip type of handle 2, FIG. 4. The tapered pin and handle are steel and are welded to the spring. This spring locking pin type of fastener is then secured to the blade end of the bifurcated shank by the screw 5.

Figure 2:
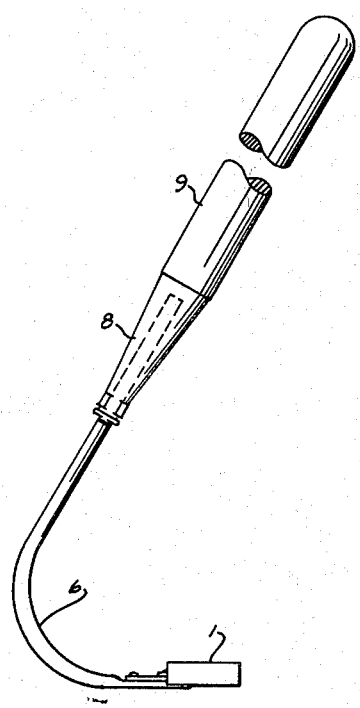
FIG. 2 is a side elevational view of the hoe.

The two blade receiving ends of the shank are flattened and contain the above fastener to secure the blade in proper position as shown in FIGS. 1 and 2.

The handle end of the shank is constructed of a single threaded rod 6, about three-eights inch diameter, which is threadably received into a nut, number 7, of the ferrule, 8, of the handle 9, as shown in FIG. 3.

A self-locking hexagonal nut ("flexlock" or equivalent) 7 is welded to the all metal ferrule 8, which is secured to the handle 9. The hoe handles of various lengths used in this invention would each have items 7, 8 and 9.

For ease in the hoes operation, the hoe handle is inclined from the hoe blade as shown in FIG. 2.

What I claim as new and desired to secure by Letters Patent is:

A garden hoe comprising: an elongated handle, a shank connected to said handle and having diverging bifurcations terminating in two blade receiving ends having blade retaining means and a blade affixed thereto, said blade retaining means comprising; a notch formed in each of said shank ends, said notches lying in a plane extending transversely of the longitudinal axis of said handle, a hole in each of said ends positioned intermediate the longitudinal extent of its associated notch and normal to said plane thereof, leaf spring means attached at a point spaced from said holes in said shank ends, said spring means extending from said point across said holes, pin means attached to said spring and removably engaging said holes, said blade being embracingly received in said slots and having holes therein spaced equally to the distance between the holes in said shank ends and each of said holes having its associated pin extending therethrough whereby said blade is quickly and easily releasable.

References Cited by the Examiner
UNITED STATES PATENTS

| | | | |
|---|---|---|---|
| 469,359 | 2/92 | Robinson | 172—371 |
| 1,484,379 | 2/24 | Rainey | |
| 1,772,181 | 8/30 | Hightower | 306—30 |
| 2,561,026 | 7/51 | LeFebvre | 306—30 X |
| 3,063,505 | 11/62 | Nelson | 172—747 |

FOREIGN PATENTS 129,807   10/50   Sweden.

References Cited by the Applicant
UNITED STATES PATENTS

| | | |
|---|---|---|
| 60,941 | 1/67 | Rose. |
| 81,839 | 9/68 | Streeter. |
| 877,913 | 2/08 | Crummer. |
| 2,064,063 | 12/36 | Hall. |

FOREIGN PATENTS 607,141   12/34   Germany.

ANTONIO F. GUIDA, *Acting Primary Examiner.*